United States Patent Office 3,372,158
Patented Mar. 5, 1968

3,372,158
PROCESS FOR THE PREPARATION
OF PENICILLINS
Brian William Hatt, Redhill, and Harry Smith, Maplehurst, near Horsham, England, assignors to Beecham Group Limited, Brentford, England, a British company
No Drawing. Filed Mar. 4, 1966, Ser. No. 531,738
Claims priority, application Great Britain, Mar. 18, 1965, 11,464/65
2 Claims. (Cl. 260—239.1)

This invention relates to a process for the preparation of penicillins and is particularly concerned with the preparation of aminoacylpenicillins.

The penicillins produced by the process of the present invention are of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria.

The present invention provides a process for the preparation of penicillins of the formula:

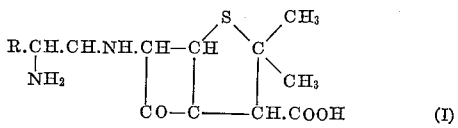

and non-toxic salts thereof, wherein R is a substituted or unsubstituted phenyl or heterocyclic group, which process comprises treating an N-protected penicillin of the formula:

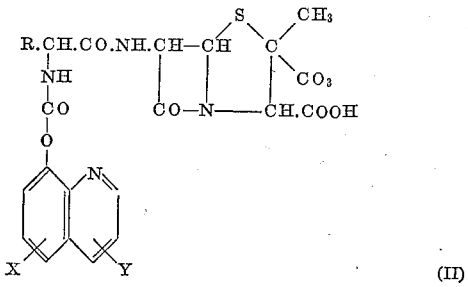

wherein R is as hereinbefore defined and X and Y are the same or different and are each a hydrogen or halogen atom or a lower alkoxy group with a salt of a heavy metal in aqueous or partly aqueous solution at a pH between 1 and 7. Preferably, the heavy metal is copper and the process is carried out with aqueous cupric acetate at pH 3 and at room temperature.

The salts are non-toxic salts including non-toxic metallic salts such as sodium, potassium, calcium and aluminium, the ammonium salt and substituted ammonium salts, e.g. salts of such non-toxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin.

The N-protected penicillins (II), which are novel compounds, are prepared by reacting 6-aminopenicillanic acid or a salt thereof in aqueous or anhydrous media with a reactive derivative of a carboxylic acid of the general formula:

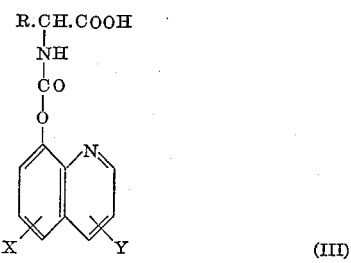

where R, X and Y are as hereinbefore defined.

Examples of suitable reactive derivatives are mixed anhydrides (including those obtained by treating a salt of the acid in anhydrous medium with an alkyl chlorocarbonate) and the intermediates formed by reacting the acid (III) with a carbodiimide, e.g. N,N'-dicyclohexylcarbodiimide, or with carbonyldiimidazole.

In a preferred form of the invention the N-protected penicillins (II) are not isolated but are hydrolysed directly in situ.

The progress of the conversion of the N-protected penicillin (II) into the aminopenicillin (I) may, if desired, be followed by withdrawing small samples from the reaction mixture at timed intervals and examining their composition by paper chromatography. The results suggest that removal of the protecting group is not a simple process. Thus when the protection penicillin (II; R=Ph; X=Y=H) is treated with cupric acetate at pH 3 in aqueous dioxan at room temperature the chromatograms show that the zone of antibiotic activity due to the protected penicillin has disappeared after about 5 minutes. Nevertheless, the new zone of antibiotic activity due to the free aminopenicillin (I; R=Ph) appears only slowly, and increases in size over a period of at least 6 hours. The resulting aminopenicillin (I) may be isolated and purified by any of the conventional procedures used for aminopenicillins.

The following examples illustrate the present invention:

*Example 1.—D-α-quinol-8-yloxycarbonylamino-α-phenylacetic acid*

D-(−)-α-amino-α-phenylacetic acid (8.82 g.) was dissolved in water (470 ml.) by the addition of triethylamine (24.7 ml.) and stirred while a suspension of di-quinol-8-yl carbonate (18.6 g.) in tetrahydrofuran (880 ml.) was added in one portion. After stirring for five minutes triethylamine (5 ml.) was added to give a clear solution, which was allowed to stand at room temperature for three hours. The tetrahydrofuran was evaporated at reduced pressure and temperature below 30° C., whereupon a yellow solid precipitated. The mixture was acidified with glacial acetic acid (50 ml.) which caused the first solid to dissolve and be replaced by a pale yellow-green precipitate. The mixture stood at 5° C. for 1 hour, then the product was collected, washed and dried in vacuo over phosphorous pentoxide to give D-α-quinol-8-yloxycarbonylamino-α-phenylacetic acid (11.0 g.) M.P. 254–5° C. (d). (Found: C, 66.8; H, 4.4; N, 8.4. $C_{18}H_{14}N_2O_4$ requires C, 67.1; H. 4.4; N, 8.7%.)

*Example 2.—Sodium 6-(D-α-quinol-8-yloxycarbonyl-amino-α-phenylacetamido)-penicillanate*

D-α-quinol-8-yloxycarbonylamino-α-phenylacetic acid (3.22 g.) was suspended in anhydrous acetone (30 ml.), treated with triethylamine (1.4 ml.), and the cloudy solution cooled to −5° C. Ethylchloroformate (0.954 ml.) was added in one portion and the mixture stirred at −5° C. for fifteen minutes. The mixture was then cooled to −15° C. and a solution of 6-aminopenicillanic acid (2.16 g.) and triethylamine (1.4 ml.) in water (10 ml.) and acetone (10 ml.), which had been cooled to 0° C., was added in one portion. The mixture was then allowed to stand for thirty minutes without external cooling, filtered to remove a small amount of insoluble material, and the acetone evaporated from the filtrate at low pressure and temperature below 20° C. The remaining turbid liquid was covered with n-butanol (20 ml.) and carefully acidified with stirring to pH 3.5 with 5 N hydrochloric acid. The two phases were separated and the aqueous phase was again extracted with n-butanol (two portions of 20 ml.). The combined organic extracts were washed with water (two portions of 20 ml.), then with saturated brine (two portions of 20 ml.), and then clarified by filtration through a siliconised filter paper. A 2 N solution of sodium 2-ethylhexoate in n-butanol (5 ml.) was then added. The resulting solution was added dropwise with stirring to dry diethyl ether (800 ml.). The resulting white precipitate was collected, washed with dry diethyl ether (200 ml.), and dried in vacuo over phosphorus pentoxide to give sodium 6-(D-α-quinol-8-yloxycarbonyl-amino-α-phenylacetamido) penicillanate.

The hydroxyalmine and alkalimetric assay procedures indicated that this product was almost pure.

*Example 3.—The preparation of 6-[D(−)α-amino-phenylacetamido]penicillanic acid*

Sodium 6-(D-α-quinol-8-yloxycarbonylamino-α-phenyl-acetamido)penicillanate (1 g.) was dissolved in water (200 ml.) and dioxan (200 ml.) and brought to pH 3 with 5 N hydrochloric acid. To this solution was added a solution of cupric acetate (0.166 g.) in water (20 ml.) and the mixture was stirred at room temperature for seventeen hours. The solution was then filtered and evaporated to reduce volume (ca. 10 ml.) at low pressure and temperature below 20° C. The precipitate which formed was filtered off and discarded. The remaining liquid was evaporated to dryness at low pressure and temperature below 20° C., and finally dried in vacuo over phosphorus pentoxide to give a solid (0.35 g.) which was shown by chromatographic methods to contain 6-[D-(−)α-amino-phenylacetamido]penicillanic acid. The hydroxylamine assay procedure indicated this solid to be 22% pure.

We claim:
1. In a process for the preparation of penicillins of the formula:

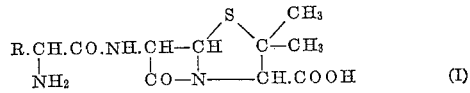

and physiologically acceptable non-toxic salts thereof, wherein R is phenyl, the improvement which comprises treating an N-prtoected penicillin of the formula:

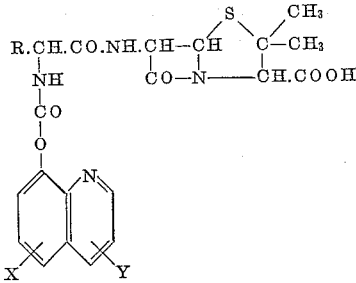

wherein R is as hereinbefore defined and X and Y are the same or different and are each hydrogen, halogen, lower alkyl or lower alkoxy with a salt of a heavy metal in aqueous or partly aqueous solution at a pH between 1 and 7.

2. A process as claimed in claim 1 wherein the heavy metal is copper and the process is carried out with aqueous cupric acetate at pH 3 and at room temperature.

References Cited

UNITED STATES PATENTS 2,985,648   5/1961   Doyle et al.

NICHOLAS S. RIZZO, *Primary Examiner.*